(12) United States Patent
Ohkawa

(10) Patent No.: US 6,746,130 B2
(45) Date of Patent: Jun. 8, 2004

(54) LIGHT CONTROL SHEET, SURFACE LIGHT SOURCE DEVICE AND LIQUID CRYSTAL DISPLAY

(75) Inventor: Shingo Ohkawa, Yoshikawa (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/020,280

(22) Filed: Dec. 18, 2001

(65) Prior Publication Data

US 2002/0102087 A1 Aug. 1, 2002

(30) Foreign Application Priority Data

Dec. 25, 2000 (JP) .......................................... 2000-392846

(51) Int. Cl.[7] ................................................. F21V 7/04

(52) U.S. Cl. ............................. 362/31; 362/26; 362/33; 362/296; 362/307; 362/308; 362/328; 362/329; 349/62; 349/63; 349/64; 349/65

(58) Field of Search ............................. 362/31, 33, 26, 362/296, 307, 308, 328, 329, 332, 330, 331; 349/62–65

(56) References Cited

U.S. PATENT DOCUMENTS 6,222,689 B1 * 4/2001 Higuchi et al. ............. 359/837
6,467,925 B2 * 10/2002 Egawa et al. ................. 362/31

FOREIGN PATENT DOCUMENTS

WO          98/40664          9/1998

* cited by examiner

Primary Examiner—Sandra O'Shea
Assistant Examiner—Mark Tsidulko
(74) Attorney, Agent, or Firm—Staas & Halsey LLP

(57) ABSTRACT

A light control sheet suitable for direction-controlling an angularly extending oblique input light, surface light source device and LCD using the light control sheet. A light control sheet is disposed along an emission face of a light guide plate direction-controls main and subsidiary light fluxes to cause them to be emitted toward a desired direction. Main beam S1 emitted from the emission face transmits (with a small refraction) through a first face, being inner-reflected (total reflection) by a first slope region and then outputted from a light output face (SS1). First subsidiary beam T1 transmits (with a small refraction) through the first face, being inner-reflected (total reflection) by a second slope region and then outputted from the light output face (TT1).

9 Claims, 8 Drawing Sheets

LIGHT CONTROL SHEET, SURFACE LIGHT SOURCE DEVICE AND LIQUID CRYSTAL DISPLAY

BACKGROUND

1. Field of Invention

The present invention relates to a light control sheet to direction-control an angularly extending light inputted from an oblique direction so that an output light is directed to an desired direction, also relating to a surface light source device and LCD using the light control sheet. The present invention is applicable to general light controls and various devices which require an illumination light extending like a face, for example, display incorporated in a personal computer or car navigation system.

2. Related Art

A proposed surface light source device employs a light guide plate made of a transparent light guiding material or light scattering-guiding material and a prism sheet, being broadly applied to various uses such as backlighting of liquid crystal display. A prism sheet is a most popular light control sheet which is used for direction-control an obliquely inputted light so that an output light is directed to an desired direction. A prism sheet is made of a light-permeable material having a prismatic surface provided with a great number of prism-like projection rows.

FIG. 1a is a partially exploded view illustration an outlined structure of a liquid crystal display provided with a backlighting arrangement in which a surface light source device of side light type employing a conventional and usual prism sheet, and FIG. 1b is a partially enlarged cross section view a part of the liquid crystal display. It is noted that thickness of a prism sheet 4 or other members, formation pitch an depth of prism elements and so forth are exaggerated for the sake of illustration.

Referring to the figures, reference numeral 1 denotes a light guide plate that is an optical member formed of transparent light guiding material or light scattering-guiding material and having a wedge-like cross section. Light scattering-guiding material is a well-known optical material having both light-guiding function and inner-scattering function, being made of, for instance, matrix of polymethyl methacrylate (PMMA) and "substance having a different refractive index" which is uniformly disposed in the matrix. It is noted that "substance having a different refractive index" is substance having a refractive index substantially different from that of the matrix.

A thicker end face of the light guide plate 1 provides an incidence end face 2 near to which a primary light source element (fluorescent lamp) L backed by a reflector R is disposed. The light guide plate 1 has major faces, one (front face) providing an emission face 5, the other (rear face) providing a back face 6. A reflector 3 is disposed along the back face 6. The reflector 3 is formed of silver foil with regular reflectivity or white sheet with diffusive reflectivity.

Ae known well, the emission face 5 emits an emission flux having a n obliquely-forwarding directivity. The prism sheet 4 is arranged on the outside of the emission face 5 so that a prismatic face (light input face) is directed inward.

Referring to the partially-exploded illustration, a light output face (outer face) 4c provides a flat surface. On the outside of the light output face 4c disposed is a liquid crystal display panel LP and a polarization separating sheet LS which is interposed between the light output face (outer face) 4c and the liquid crystal display panel LP. The liquid crystal display panel LP has a well-known structure such that elements such as liquid crystal cell and transparent electrodes are interposed between two polarizing plates arranged so that their polarization axes make the right angle with each other.

The polarization separating sheet LS is an optical element that tends to be used currently, being disposed between a polarizing plate on the inside of the liquid crystal display panel LP and the prism sheet 4. The polarization separating sheet LS has a property that shows a high transmissivity for a polarization component parallel to a polarization axis of the polarizing plate on the inside of the liquid crystal display panel LP and shows a high reflectivity for a polarization component perpendicular to the polarization axis of the polarizing plate on the inside of the liquid crystal display panel LP.

It is noted that a space (air layer), not shown, is formed between the liquid crystal display panel LP and the polarization separating sheet LS or between the liquid crystal display panel LP and the prism sheet 4 (if no polarization separating sheet is employed), as required, in order to prevent these members to be stuck to each other.

The prism sheet 4 has an input face provided by a prism surface having a great number of prism element rows. These prism element rows are orientated generally in a direction parallel to the incidence end face 2 of the light guide plate 1. As shown in a partially enlarged cross section FIG. 1b, each prism element row a pair of slopes 4a and 4b which provides a V-shaped groove.

Angle $\phi a$ is defined as an inclination angle of a first slope 4a directed toward the side of the incidence end face 2 and $\phi b$ is defined as an inclination angle of a second slope 4b directed to the opposite side. Angles $\phi a$ and $\phi b$ are measured with respect to a frontal direction (See reference N), respectively. A prism sheet that satisfies a condition, substantially $\phi a = \phi b$ (0 degree $\leq \phi a < 90$ degrees), is called "symmetric prism sheet" and a prism sheet that satisfies a condition, substantially $\phi a \neq \phi b$, is called "asymmetric prism sheet". An asymmetric prism sheet is disclosed in WO98/40664.

Light is introduced into the light guide plate 1 from the light source element L, being guided toward a thinner side end face 7 with repeated reflections at the emission face 5 and back face 6. On the way of this travelling, illumination light is emitted from the emission face (front face) 5 gradually. The emission face 5 may have a matted surface or inner scattering may be utilized (if light scattering guide is employed) in order to promote emission.

As known well, the emission face 5 provides emission which shows a clear directivity to a direction inclined forward as a whole (Emission directivity of light guide plate). It is noted that such emission directivity may be relaxed if the emission face 5 or the back face 6 is provided with light diffusibility.

FIG. 2 is a graph showing angular intensity characteristics of emission from an emission face 5 of a typical light guide plate (transparent light guide plate having a matted emission face). In the graph, the abscissa shows directions in a plane perpendicular to the incidence end face 2. Angle indication of 0 degree denotes a frontal direction, and minus values correspond to the side of incidence end face 2 and plus values correspond to the side of distal end (forward side). The ordinate shows luminance in unit "a.u." that is defined so that the peak value is just "1.0".

As understood from this graph, the emission flux has a remarkably clear directivity such that a peak direction (emission angle of a main beam) is somewhat greater than 70 degrees. In general, angular position of peak direction may vary in a variation range from several degrees to ten and several degrees in dependence on factors such as size or material (transparent material or light scattering guide) of the light guide plate, properties of the emission (ability of light scattering) face and back face, and property of the reflection sheet disposed on the side of the back face. However, in general, there are no great difference among curves of graph provided in the respective cases.

FIG. 3 is a diagram illustrating a fundamental operation of the light control sheet 4, which is conventionally used, wherein it is provided that the light guide plate 1 has emission directivity of as described.

Referring to FIG. 3, the prism sheet 4 is disposed along the emission face 5 of the light guide plate 1 so that the prismatic surface is directed inward. Each prism element has a vertical angle, for example, $\phi a+\phi b$=about 66 degrees.

If the light guide plate of the above-mentioned example is employed and light is supplied from a direction of arrow L1, a propagation direction of a beam representing the emission flux from the emission face 5 gives an angle $\theta 2$=about 73 degrees as understood from the above description. Considering that the light guide plate has a refractive index about 1.5, an incident angle $\theta 1$ to the emission face 5 must be about 38 degrees for rendering $\theta 2$ about 73 degrees. Hereafter in this specification, a flux of beams corresponding to a preferential propagation direction is called "main light flux". A beam representing the propagation direction of such main light flux is called "main beam". In the illustration, a main beam is denoted by reference symbol S1.

The main beam S1 emitted from the emission face 5 is incident to a slope 4a, one of a pair of slopes, of the prism sheet 4 at a remarkably small incidence angle after travelling an air layer AR (refractive index n0=about 1.0) straight. There is actually little probability that the main beam is incident to the other slope 4b.

Then the main beam S1 travels the inside straight as far as the slope 4b, being regularly reflected by the slope 4b. The beam regularly reflected is incident to a light output face 4c of the prism sheet 4 at a roughly right angle, being emitted from the prism sheet 4.

On the way of this process, the main beam S1 is caused to have a traveling direction modified to an approximately frontal direction with respect to the prism sheet 4. Precise values of $\phi a$ and $\phi b$ can be determined in designing under consideration of a peak angle of emission intensity and refractive index of the prism sheet 4, with assistance of Snell's Law on refraction.

As described above, so far as the main beam, the output light S1 of the prism sheet 4 can be directed to a desired direction (usually an approximately frontal direction) if inclination angles $\phi a$ and $\phi b$ of the slopes 4a and 4b have appropriate values, respectively.

However, as understood from the graph of FIG. 2, the emission from the emission face 5 includes not only the main beams but also beams which are angularly distributed to some angular range on both sides of the main beams. In the present specification, beams in the left side vicinity of the luminance peak in the graph of FIG. 2 are called a first subsidiary light flux and beams in the right side vicinity of the same luminance peak are called a second subsidiary light flux for the sake of convenience. Further to this, of the first and second subsidiary fluxes are direction-represented by beams which are called a first subsidiary beam and a second subsidiary beam.

As explained above, if the prism sheet is designed under consideration focused on a main beam representing the main light flux, the first and second subsidiary beams are emitted, as a matter of course, toward directions deviated from an output direction of the main beam S1, with the result that some of the subsidiary beams hardly contribute to an illumination operation. In other words, there arises a problem with direction control of subsidiary light flux is subject.

So far as the second subsidiary light flux, if an asymmetric prism sheet disclosed in International Publication WO 98/40664 is employed, much of the second subsidiary light flux can have an output direction similar to that of the main beam.

To the contrary, regarding the first subsidiary light flux, namely, regarding a light flux that is emitted from the emission face 5 toward a direction nearer to the frontal direction as compared with the main beam, the above problem has not been solved and no desirable control of output direction has been achieved.

OBJECT AND SUMMARY OF INVENTION

An object of the present invention is to overcome the above problem. In other words, an object of the present invention is to provide a light control sheet that is able to give an well-controlled output direction to light which is inputted from a direction biased to a frontal direction with respect to a main beam.

Another object of the present invention is to provide a surface light source device that is able to have an well-controlled emission directivity by means of the improved light control sheet. And still another object of the present invention is to provide a liquid crystal display that is able to display an image looking bright as viewed from a certain direction.

The present invention is based on a viewpoint that an input light to a light control sheet, that is used for light-direction-controlling in a surface light source device or the like, can be regarded as a composite light flux generally consisting of a main beam travelling toward a direction inclined with respect to a frontal direction and a subsidiary light flux distributed angularly around the main beam. The present invention improve a light control as to give a well-controlled direction to not only the main beam but also to the subsidiary light flux, applying the improved light control sheet to a surface light source device and liquid crystal display to solve the above problem.

In the first place, the present invention is applied to alight control sheet having a face to provide a light input face and another face to provide a light output face, said light input face being provided with a great number of projection rows running in parallel with each other.

According to an improvement in accordance with the present invention, each of said great number of projection rows includes a first face and a second face, said second face being inclined with respect to a frontal direction of said light control sheet and having a tendency that inclination angle gets smaller with an increasing distance from a top of each of said great number of projection rows.

And said first face is formed so as to introduce an oblique input light containing both a main light flux, which travels in a direction inclined with respect to said frontal direction, and a first subsidiary light flux, which travels in a direction angularly nearer to said frontal direction as compared with said main light flux, and further as to then cause said oblique input light to be inner-incident to said second face.

In a typical embodiment, said second face includes a first region inclined at a first inclination angle with respect to said frontal direction and a second region inclined at a second inclination angle with respect to said frontal direction, said second region being more distant from said top as compared with said first region, said second inclination angle being smaller than said first inclination angle.

In a case where said oblique light further contains a second subsidiary light flux which travels in a direction angularly farther from said frontal direction as compared with said main light flux, the light control sheet is preferably structured so that that said second subsidiary light flux propagates from said first face to said second face and, after being inner-reflected at said second face, is directed to said light output face.

In the next place, the present invention is applied to a surface light source device comprising a light guide plate, a primary light source to supply light to said light guide plate from an end portion of said light guide plate and a light control sheet disposed along an emission face provided by a major face of said light guide plate. Said improved light control sheet is arranged so that said light input face is directed to said light guide plate and a great number of projection rows runs approximately in parallel with an incidence end face provided at said end portion.

From said emission face of said light guide plate supplied is an oblique input light that contains both a main flux travelling toward a direction inclined with respect to a frontal direction of said light control sheet and a first subsidiary flux travelling toward a direction nearer to the frontal direction as compared with said main flux, said input light being introduced into said light control sheet through said first face and then being inner-incident to said second face.

It is noted that a second subsidiary flux travelling toward a direction much deviated from the frontal direction as compared with said main flux is emitted from said emission face and said light control sheet is preferably structured so that the second subsidiary flux travels from said face to said second face, being inner-reflected by said second face toward said first face to be inner-reflected by said first face and directed to said output face.

A surface light source device improved in the above-mentioned manners may be employed for illuminating a liquid crystal display panel of a liquid crystal display. If so employed, the liquid crystal display carries on characteristics of the surface light source device. Therefore a liquid crystal display in accordance with the present invention provides a display screen that looks bright from a certain viewing direction.

EMBODIMENT

Figure 1:
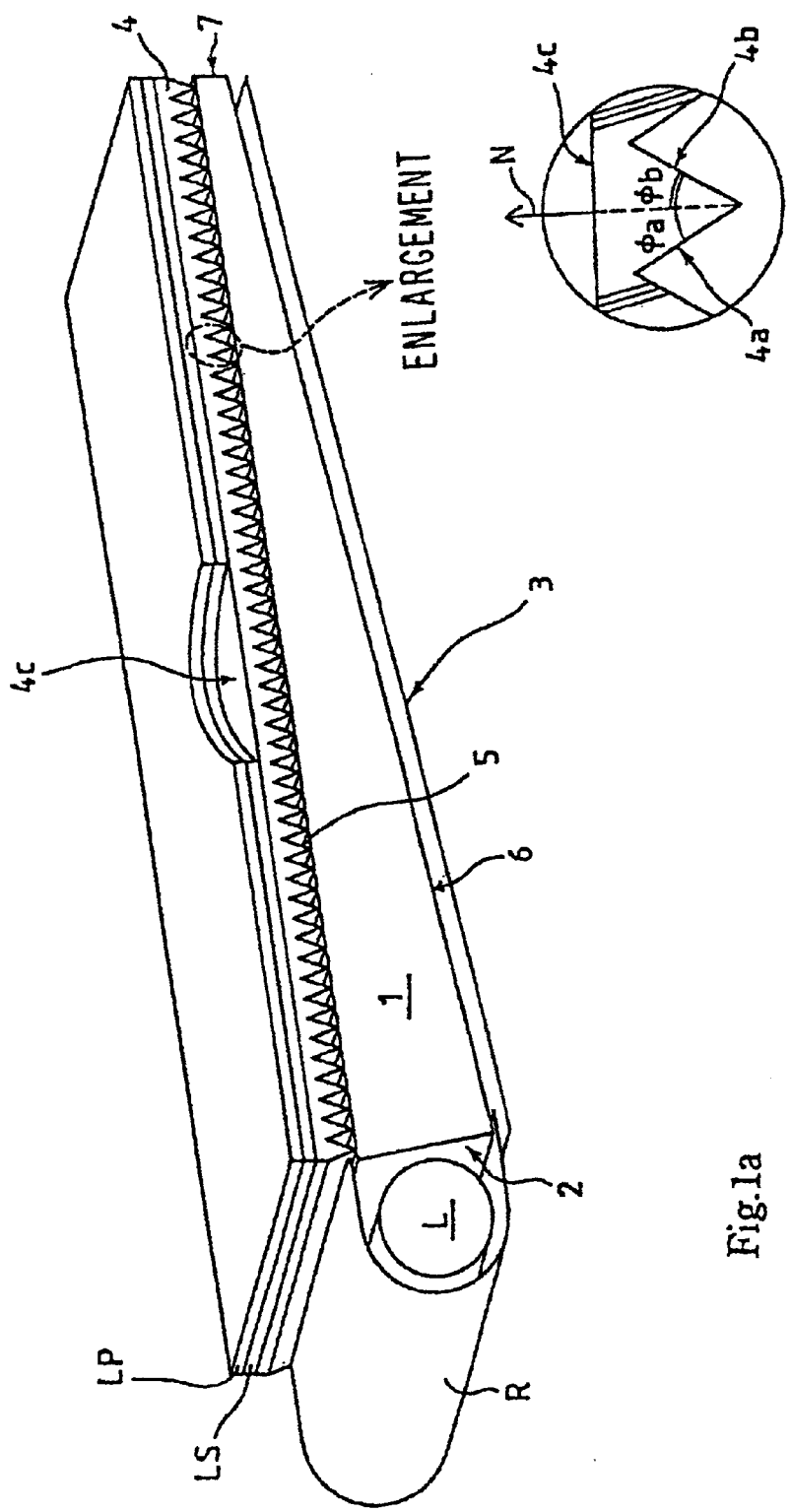
FIG. 1*a* is a partially exploded perspective outline view of a liquid crystal display equipped with a surface light source device of side light type employing a conventional light control sheet.
FIG. 1*b* is a partially enlarged cross section view of the liquid crystal display shown in FIG. 1*a;*

Embodiment of the present invention are described below. In drawings for illustrating outlined structures of the embodiments, thickness of a light control sheet and other elements and factors such as pitch or depth of projection rows are exaggerated for the sake of illustration. Elements shown and denoted by reference symbols in FIGS. 1*a*, 1*b* are also denoted by the same reference symbols so far as being used in common.

Figure 4:
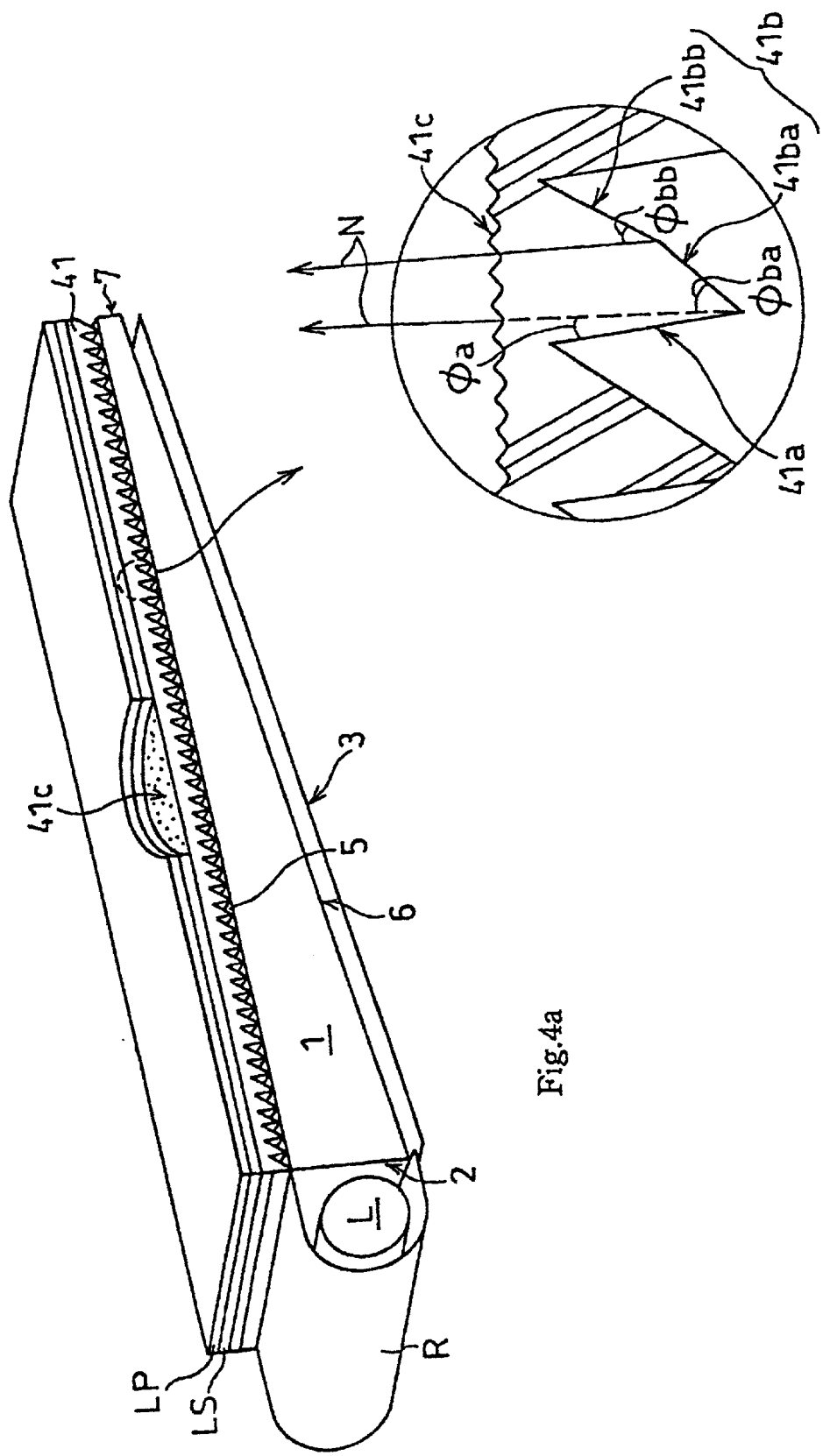
FIG. 4*a* is a partially exploded perspective outline view of an embodiment in accordance with the present invention.
FIG. 4*b* is a partially enlarged cross section view of the embodiment shown in FIG. 4*a;*

FIG. 4*a* is a partially exploded perspective outline view of a first embodiment in accordance with the present invention and FIG. 4*b* is a partially enlarged cross section view of the embodiment shown in FIG. 4*a*. This embodiment is, although being structured in a similar way as compared with the conventional liquid crystal display shown in FIGS. 1*a* and 1*b*, different from the conventional liquid crystal display in that a light control sheet 41 featured by the present invention is disposed along an emission face 5 of a light guide plate 1 instead of the prism sheet 4.

The light control sheet 41 has projection rows each of which includes a first face 41*a* and second face 41*b* as illustrated in a partially enlarged cross section view. And the second face 41*b* is divided into a first slope region 41*ba* and second slope region 41*bb*. The former is located closer to a top of each projection row as compared with the latter.

Inclination angle $\phi a$ of a first slope 41*a* directed to the incidence end face 2 is preferably small and falls within a range from several degrees to 10 degrees, being 3 degrees in the illustrated case. On the other hand, both inclination angles $\phi ba$ of a first slope region 41*ba* and $\phi bb$ of a second slope region 41*bb* fall in a range spanning angeles remarkably greater than $\phi a$.

It is important that there is a relation $\phi ba > \phi bb$. That is, the second face 41*b* is formed so that its inclination tends to be steeper on a top side a projection row than on a foot side a projection row with respect to a frontal direction N. This embodiment employs tow-step inclination variation as an example.

It is note that this embodiment has an optional feature that the light control 41 has an light output face 41*c* has a slightly non-glaring-processed surface (matted surface). This prevents a periodically formed projection rows from being seen from the side of the light output face 41*c*. Further, this prevents the periodically formed projection rows, if it overlaps with a fine periodic structure of a liquid crystal display panel LP, from causing to bring Moire fringes.

Except these differences, elements are structured and arranged in common with those of the conventional surface light source device of side light type shown in FIGS. 1*a* and 1*b*.

That is, a light guide plate denoted by reference numeral 1 is an optical member having a wedge-like cross section formed of a transparent light guide or light scattering guide. The incidence end face 2 is provided by a thicker side end face close to which a fluorescent lamp (cold cathode lamp) L is disposed as a primary light source element backed by a reflector R.

It is needless to say that a primary light source of different type such as LED array may be employed. A reflector 3 made of a regularly reflective silver foil or irregularly reflective white sheet is disposed along a back face 6 of the light guide plate 1.

The liquid crystal display LP is disposed on the outside of a polarization separating sheet LS disposed on the outside of the light control sheet 41 that is disposed along the emission face 5 provided by a major face of the light guide plate 1. A great number of projection rows formed on a light input face of the light control sheet 41 run in a direction approximately parallel to the incidence end face 2. The projection rows, each including a first face and two-step-inclination second face as mentioned above, provide modified V-shaped grooves.

Light of the light source element L is introduced into the light guide plate 1 and then emitted from the emission face 5 gradually according to well-known steps as mentioned with referring to FIGS. 1*a* and 1*b*. This emitted light shows angular emission characteristics as graph-illustrated in FIG. 2.

An emission flux emitted from the emission face 5 is polarization-separated by the polarization separating sheet LS after being effected by the light control sheet 41, back-illuminating the liquid crystal display LP. It is noted that the polarization separating sheet LS may be omitted.

Figure 5:
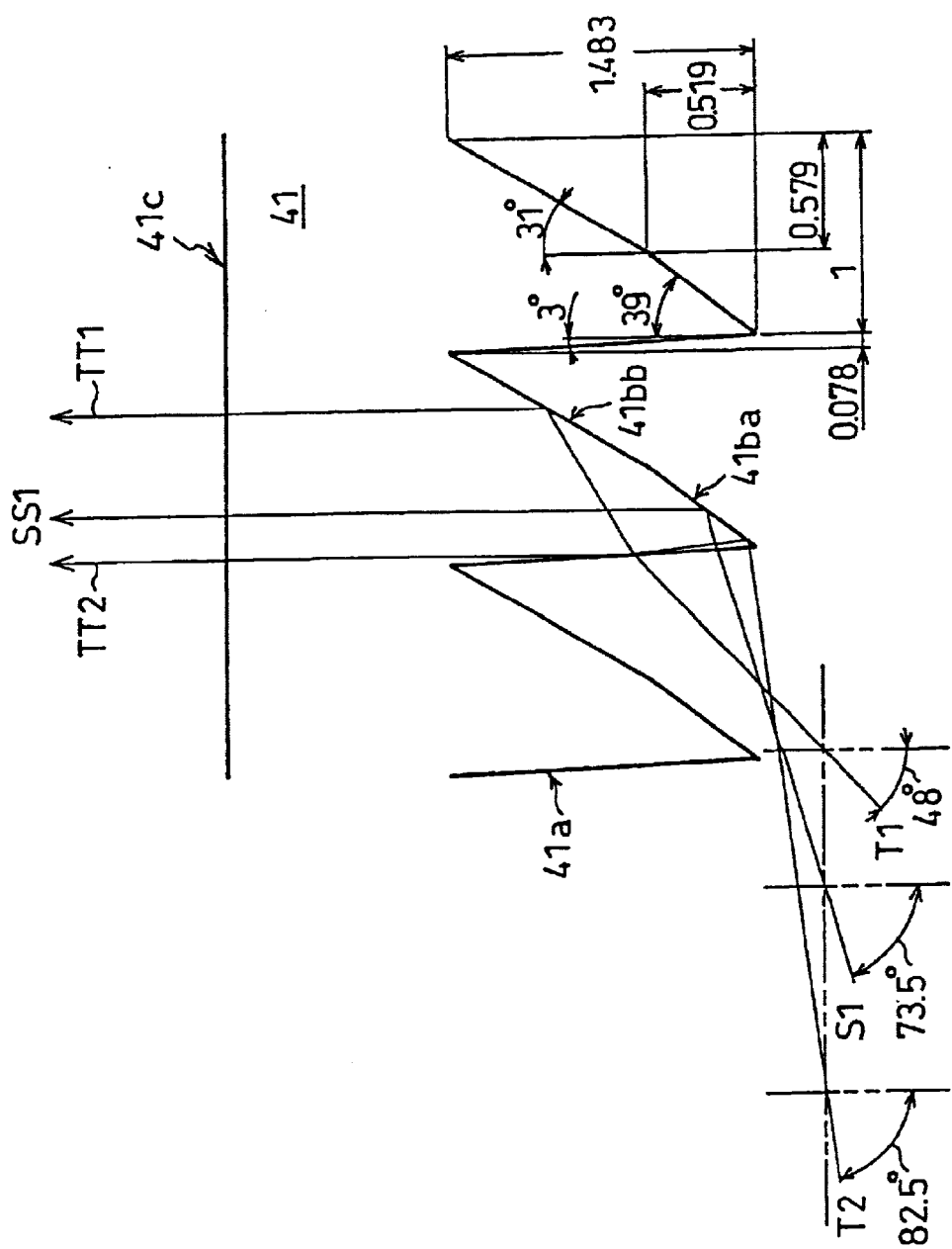
FIG. 5 is a diagram illustrating an example of projection row configuration and light paths of main and subsidiary beams.

Hereafter described are operations of the light control sheet 41, examples of inclinations angles φa, φba, φbb and other matters with referring to FIG. 5 in addition.

FIG. 5 shows an example of projection row configuration that is suitable for a light guide plate outputting a main beam S1 travelling in a direction of 73.5 degrees, wherein paths of main and subsidiary beams are depicted.

Figure 2:
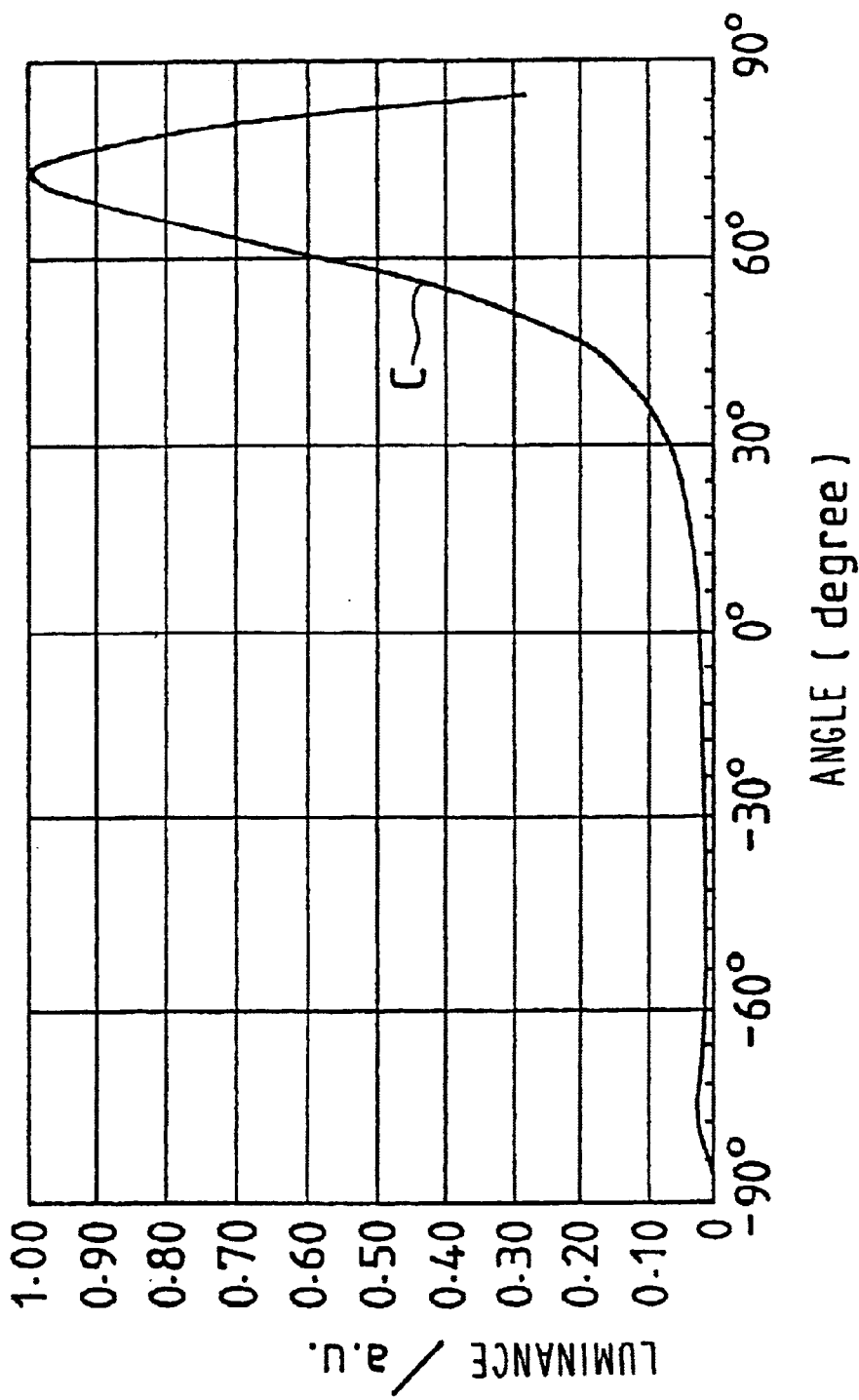
FIG. 2 is an example of emission characteristics of a light guide plate.
Figure 3:
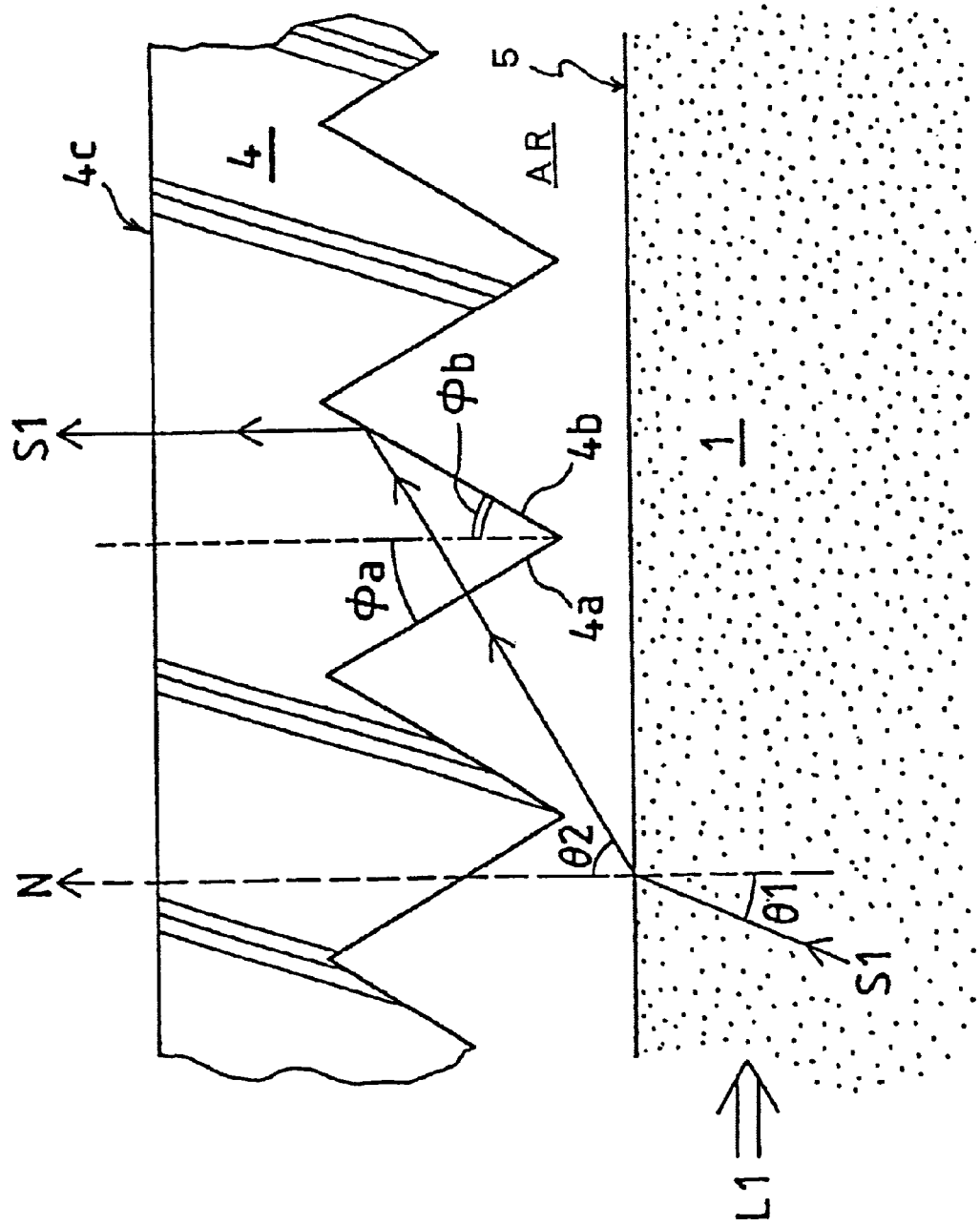
FIG. 3 is a diagram illustrating a fundamental operation of a conventionally used light control sheet.

The subsidiary beams here considered are a first subsidiary beam shown as a beam T1, which travels in a direction of 48 degrees to represent a first subsidiary flux (left side vicinity of a brightness peak in the graph of FIG. 2), and a second subsidiary beam shown as a beam T2, which travels in a direction of 82.5 degrees to represent a second subsidiary flux (right side vicinity of the brightness peak in the graph of FIG. 2). The light control sheet is made of PMMA resin having a refractive index of about 1.49.

Shown together in FIG. 5 are an example of set of inclination angles chosen so that all of three beams S1, T1 and T2 are outputted in a frontal direction of the light control sheet 41 under the above condition (See SS1, TT1, TT2). Concretely saying, each projection row has inclination angles, φa=3 degrees, φba=39 degrees, φbb=31 degrees. Ad size ration of the slope regions is as follows.

Provided that the whole of the second slope gives a projective length of "1" (wherein projective length is hereafter defined as length along a direction of projection row repeating) on a general plane representing the light input face (i.e. a plane left if the projection rows are removed), the first slope region gives a projective length of "0.421" on the general plane and the second slope region gives a projective length of "0.579" on the general plane. And the first face gives a projective length of "0.078" on the general plane and each projection has a height of "1.483" with respect to the general plane. Light path of each beam is outlined as follows (indicated with arrows).

(1) Main beam S1; emission from the emission face 5 (See FIGS. 4*a*, 4*b*)→transmission through the first face 41*a* (small angle refraction)→inner-reflection at the first slope region 41*ba* (total reflection)→output from the output face 41*c*

(2) First subsidiary beam T1; emission from the emission face 5 (See FIGS. 4*a*, 4*b*)→transmission through the first face 41*a* (small angle refraction)→inner-reflection at the second slope region 41*bb* (total reflection) →output from the output face 41*c*

(3) Second subsidiary beam T2; emission from the emission face 5 (See FIGS. 4*a*, 4*b*)→transmission through the first face 41*a* (small angle refraction)→inner-reflection at the first slope region 41*ba* (regular reflection)→inner-reflection at the first face 41*a* (total reflection)→output from the output face 41*c*

It should be noted that the first slope region 41*ba* contributes chiefly to direction conversion of the main beam S1 and the second subsidiary beam T2 and the second slope region 41*bb* contributes chiefly to direction conversion of the first subsidiary beam T1. This is owing to a fact that the subsidiary beam T1 is inputted to the light control sheet at an angle that allows the subsidiary beam T1 to go deep into a groove between projections more easily as compared with the main beam S1 and the second subsidiary beam T2.

Thus, it is easily inferred that fluxes angularly near to the main beam S1 will be outputted toward directions around the direction SS1. In a similar way, it is easily inferred that fluxes angularly near to the subsidiary beam T1 will be outputted toward directions around the direction TT1 and fluxes angularly near to the subsidiary beam T2 will be outputted toward directions around the direction TT2.

After all, this embodiment allows much of fluxes widely distributing around the main beam S1 to be emitted approximately toward the frontal direction. In such effects, a particularly important one indigenous of the present invention is that the second face is divided into the first slope region relatively near to the projection top and the second slope region different from the first slope region in inclination to make the second slope region steeper (namely, having a smaller inclination angle with respect to the frontal direction of the light control sheet) as compared with the first slope region.

In addition to this, if each first face of each projection is designed as to provide a steep slope allowing the second subsidiary beam T2 to be inner-reflected at both the first face and the second face (the first slope region), well results will be expected as understood from the above-described example.

As understood from the above-described example, if generalize functions of each second face (each face farther from the incidence end face 2), it is desirable that inner-reflection occurs at an growingly steeper slope as an input beam is angularly closer to the frontal direction. In other words, if each second face of each projection row is configured as to have such a tendency, configurations other than tow-step inclination as above will show similar effects.

Figure 6:
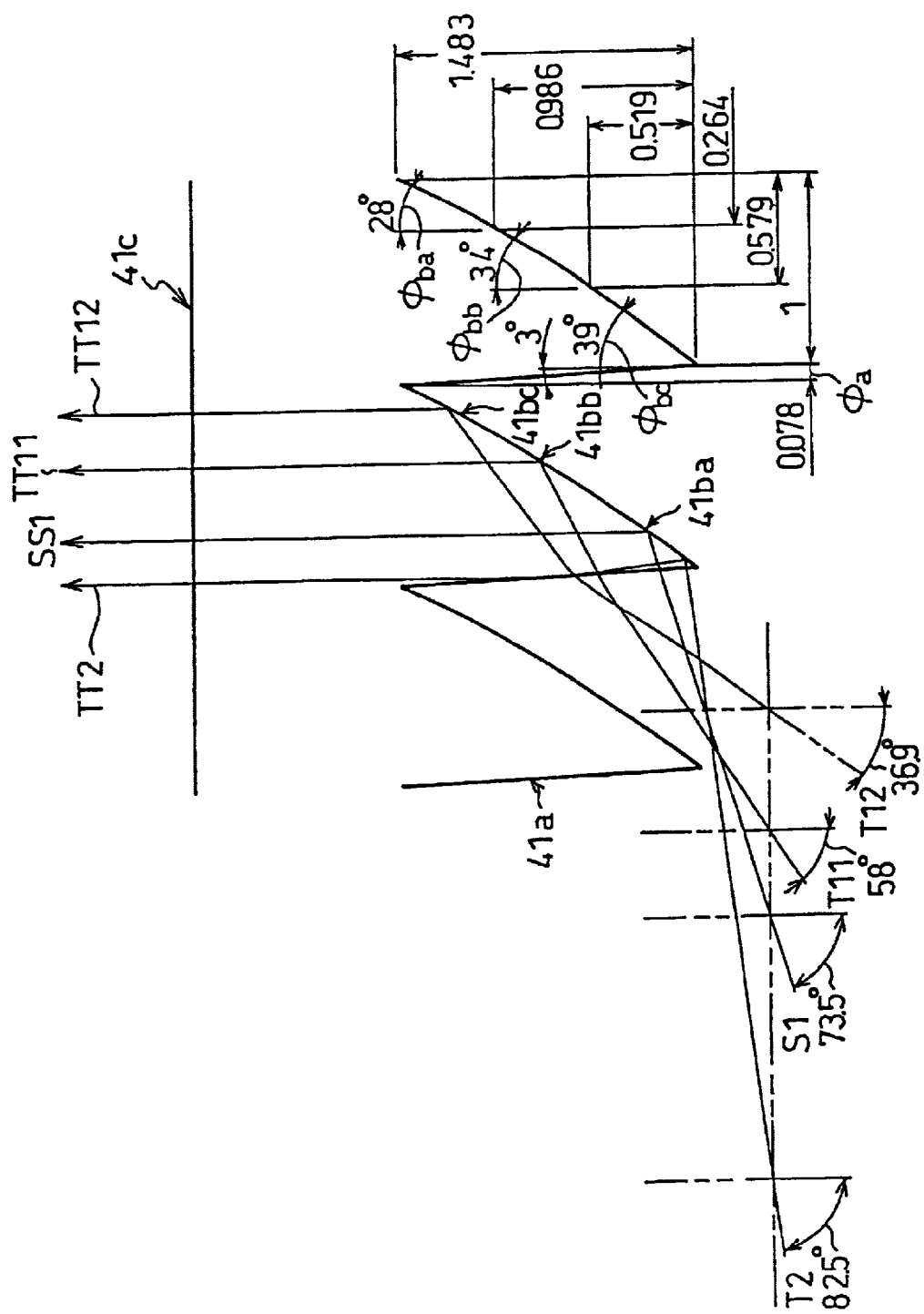
FIG. 6 is a diagram illustrating another example of projection row configuration and light paths of main and subsidiary beams.

One of such modified examples is illustrated in FIG. 6. Conditions are described below in common with the case shown in FIG. 5. It is noted that two directions representing the first subsidiary flux are employed for the sake of numeral designing.

(i) Travelling direction of the main beam S1; direction of 73.5 degrees
(ii) Travelling direction of first-one of the first subsidiary beams T11; direction of 58 degrees
(iii) Travelling direction of second-one of the first subsidiary beams T12; direction of 36.9 degrees
(iv) Travelling direction of the second subsidiary beam T2; direction of 82.5 degrees
(v) The light control sheet is made of PMMA resin having a refractive index of about 1.49.

Under these conditions, shown together in FIG. 6 are an example of set of inclination angles chosen so that all of four beams S1, T11, T12 and T2 are outputted in the frontal direction of the light control sheet 41 under the above condition (See SS1, TT11, TT12, TT2).

Concretely saying, each projection row has inclination angles, $\phi a=3$ degrees, $\phi ba=39$ degrees, $\phi bb=34$ degrees, $\phi bc=28$ degrees. And size ration of the slope regions is as follows. Every projective length is defined on the general plane representing the light input face.

Provided that the whole of the second slope gives a projective length of "1", the first slope region gives a projective length of "0.421", the second slope region gives a projective length of "0.315" and the third slope region gives a projective length of "0.264". And the first face gives a projective length of "0.078" and each projection has a height of "1.483" with respect to the general plane.

Light path of each beam is outlined as follows (indicated with arrows).

(1) Main beam S1; emission from the emission face 5 (See FIGS. 4a, 4b)→transmission through the first face 41a (small angle refraction)→inner-reflection at the first slope region 41ba (total reflection)→output from the output face 41c (2) The first-one of the first subsidiary beams T11; emission from the emission face 5 (See FIGS. 4a, 4b)→transmission through the first face 41a (small angle refraction)→inner-reflection at the second slope region 41bb (total reflection)→output from the output face 41c (3) The second-one of the first subsidiary beams T12; emission from the emission face 5 (See FIGS. 4a, 4b)→transmission through the first face 41a (small angle refraction)→inner-reflection at the third slope region 41bc (total reflection)→output from the output face 41c (4) Second subsidiary beam T2; emission from the emission face 5 (See FIGS. 4a, 4b)→transmission through the first face 41a (small angle refraction)→inner-reflection at the first slope region 41ba (regular reflection)→inner-reflection at the first face 41a (total reflection)→output from the output face 41c This example allows the first slope region 41ba to contribute chiefly to direction conversion of the main beam S1 and the second subsidiary beam T2. On the other hand, the second slope region 41bb contributes greatly to direction conversion of the first-one of the first subsidiary beams T11 and the third slope region 41bc contributes greatly to direction conversion of the second-one of the first subsidiary beams T12. This is owing to a fact that the subsidiary beams T11 and T12 are inputted to the light control sheet at angles allowing the subsidiary beams T11 and T12 to go deep into a groove between projections more easily as compared with the main beam S1 and the second subsidiary beam T2, in common with the case of FIG. 5.

It is easily inferred that fluxes angularly near to the main beam S1 in this example will also be outputted toward directions around the direction SS1. In a similar way it is easily inferred that fluxes angularly near to the subsidiary beams T11, T12 and T2 will be outputted toward directions around the direction TT11, TT12 and TT2, respectively.

After all, this embodiment also allows much of fluxes widely distributing around the main beam S1 to be emitted approximately toward the frontal direction.

Figure 7:
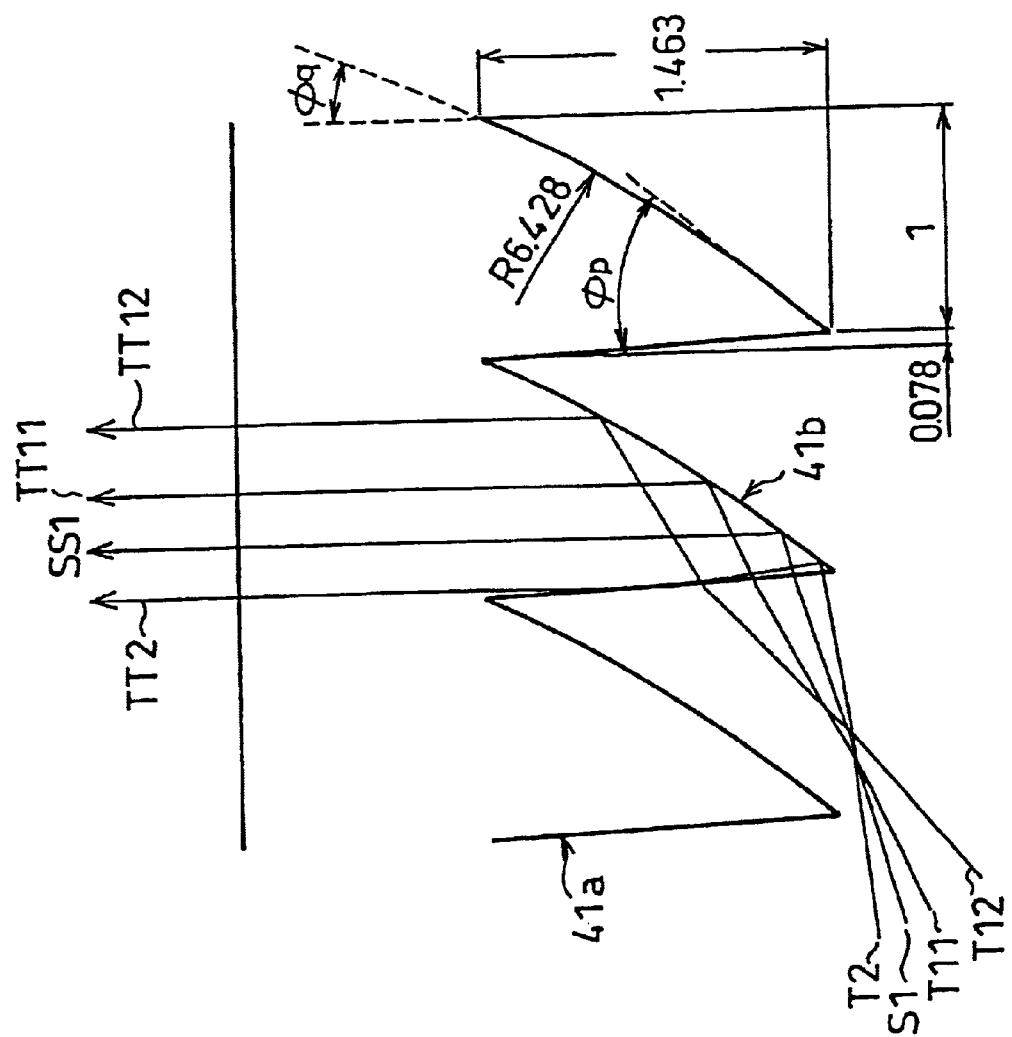
FIG. 7 is a diagram illustrating still another example of projection row configuration and light paths of main and subsidiary beams; and, FIG. 8 is a diagram illustrating a modified manner of light supply to a light guide plate.

In the next place, FIG. 7 shows an example that employs a light control sheet in which inclination angle with respect to the frontal direction continuously gets smaller with an increasing distance from each projection row top portion. So to speak, this corresponds to infinitely increased steps of inclination variation. Conditions are described below in common with the cases shown in FIGS. 5 and 6.

It is noted that travelling directions of the main beam S1, the first-one and second-one of the first subsidiary beams T11, T12 and the second subsidiary beams T2 as shown in FIG. 6 are employed in this example for drawing light paths.

The light control sheet is made of PMMA resin having a refractive index of about 1.49. Considering limitation on configuration-making, it is provided that the second face 41b is a cylindrical face and curvature was calculated so that all of four beams S1, T11, T12 and T2 are outputted in the frontal direction of the light control sheet 41 under the above condition (See SS1, TT11, TT12, TT2), the calculated curvature was 6.428.

It is noted that this value is calculated under a condition that the whole of the second slope gives a projective length of "1". Inclination angles $\phi p$ and $\phi q$ of the curved surface (cylindrical face) 41b at a top and foot of each projection row with respect to the frontal direction of the light control sheet is 41.979 degrees and 25.981 degrees. The first face gives a projective length of 0.078 and each projection has a height of "1.483" with respect to the general plane. And the first face has an inclination angle of 3 degrees.

Generally saying, there is a relation between inclination angles $\phi p$ and $\phi q$, $\phi p > \phi q$, and practical ranges of them are "$\phi p$; from about 38 degrees to about 45 degrees" and "$\phi q$; from about 23 degrees to about 32 degrees".

Light path of each beam is outlined as illustrated in the figure. Basically, the paths are similar to those of the case shown in FIG. 6, wherein the second subsidiary beam T2, the main beam S1, the first-one of the first subsidiary beams T11 and the second-one of the first subsidiary beams T12 are inner-reflected at positions getting distant from a top of each projection row in this order. It is noted that the second subsidiary beam T2 is outputted after being subject to another inner-reflection at the first face.

Although the output direction is generally a frontal direction in the above-described three examples (FIGS. 5 to 7), this does not limit the scope of the present invention. If inclination angle of the first face and inclination angles of the second face or others are modified, a highly parallel output light beams toward a direction deviated from the frontal direction by some angles can be provided. And, as required, a possible design allows the output light to have an angular extent that is intentionally controlled.

Figure 8:
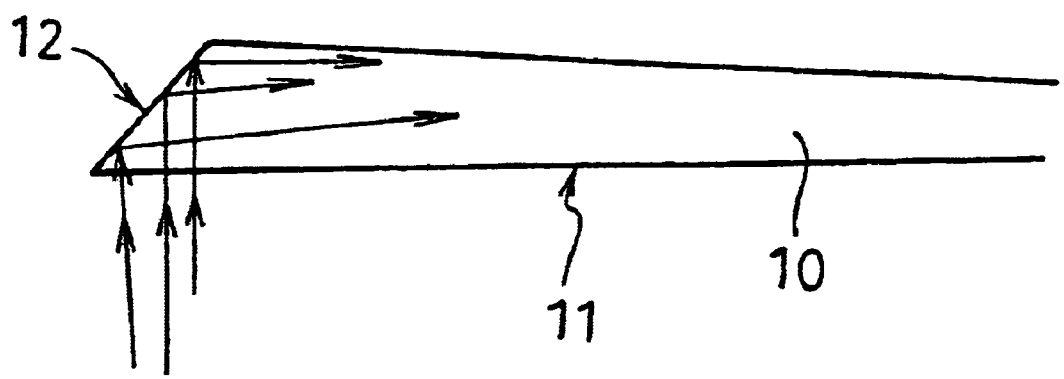

Although light supply from the primary light source is directed to the incidence end face (minor face) of the light guide plate in the above-described embodiments, other manners of light supply may be employed. For example, as shown in FIG. 8, light may be introduced from an edge portion of a back face 11 of a light guide plate 10 and inner-reflected at an inclined end face 12 to be spread within the light guide plate 10.

As explained above, the present invention provide a light control sheet that is able to give an well-controlled output direction to light which is inputted from a direction biased to a frontal direction with respect to a main beam.

And a surface light source device that is able to have an well-controlled emission directivity by means of the improved light control sheet is also obtained. Further, a liquid crystal display that is able to display an image looking bright as viewed from a certain direction by means of such an improved surface light source device.

What is claimed is:

1. A light control sheet having a face to provide a light input face and another face to provide a light output face, said light input face being provided with a great number of projection rows running in parallel with each other, wherein each of said great number of projection rows includes a first face and a second face, said second face being inclined with respect to a frontal direction of said light output face of said light control sheet and having a variation in inclination angle such that the inclination angle gets smaller with a decreasing distance from said light output face, said first face being formed so as to introduce an input light containing both a main light beam, which travels in a direction inclined with respect to said frontal direction, and a first subsidiary light beam, which travels in a direction angularly nearer to said frontal direction before being introduced to said first face as compared with said main light beam, and further as to then cause said input light to be incident to said second face.

2. A light control sheet according to claim 1, wherein said second face includes a first region inclined at a first inclination angle with respect to said frontal direction and a second region inclined at a second inclination angle with respect to said frontal direction, said second region being less distant from said light output face as compared with said first region, said second inclination angle being smaller than said first inclination angle.

3. A light control sheet according to claim 1, wherein said oblique light further contains a second subsidiary light beam which travels in a direction angularly farther from said frontal direction as compared with said main light beam, said second subsidiary light beam propagating from said first face to said second face and, after being inner-reflected at said second face, being directed to said light output face.

4. A surface light source device comprising a light guide plate, a primary light source to supply light to said light guide plate from an end portion of said light guide plate and a light control sheet disposed along an emission face provided by a major face of said light guide plate, said light control sheet having a face to provide a light input face and another face to provide a light output face, said light input face being provided with a great number of projection rows running in parallel with each other, wherein each of said great number of projection rows includes a first face and a second face, said second face being inclined with respect to a frontal direction of said light output face of said light control sheet and having a variation in inclination angle such that the inclination angle gets smaller with a decreasing distance from said light output face, said first face being formed so as to introduce an input light containing both a main light beam, which travels in a direction inclined with respect to said frontal direction, and a first subsidiary light beam, which travels in a direction angularly closer to said frontal direction before being introduced to said first face as compared with said main light beam, and further as to then cause said input light to be incident to said second face.

5. A surface light source device according to claim 4, wherein said second face includes a first region inclined at a first inclination angle with respect to said frontal direction and a second region inclined at a second inclination angle with respect to said frontal direction, said second region being less distant from said light output face as compared with said first region, said second inclination angle being smaller than said first inclination angle.

6. A surface light source device according to claim 4, wherein said oblique light further contains a second subsidiary light beam which travels in a direction angularly farther from said frontal direction as compared with said main light beam, said second subsidiary light beam propagating from said first face to said second face and, after being inner-reflected at said second face, being directed to said light output face.

7. A liquid crystal display including a liquid crystal display panel and a surface light source device illuminating said liquid crystal display panel, said surface light source device comprising a light guide plate, a primary light source to supply light to said light guide plate from an end portion of said light guide plate and a light control sheet disposed along an emission face provided by a major face of said light guide plate, said light control sheet having a face to provide a light input face and another face to provide a light output face, said light input face being provided with a great number of projection rows running in parallel with each other, wherein each of said great number of projection rows includes a first face and a second face, said second face being inclined with respect to a frontal direction of said light output face of said light control sheet and having a variation in inclination angle such that the inclination angle gets smaller with a decreasing distance from said light output face, said first face being formed so as to introduce an input light containing both a main light beam, which travels in a direction inclined with respect to said frontal direction, and a first subsidiary light beam, which travels in a direction angularly closer to said frontal direction before being introduced to said first face as compared with said main light beam, and further as to then cause said input light to be incident to said second face.

8. A liquid crystal display according to claim 7, wherein said second face includes a first region inclined at a first inclination angle with respect to said frontal direction and a second region inclined at a second inclination angle with respect to said frontal direction, said second region being less distant from said light output face as compared with said first region, said second inclination angle being smaller than said first inclination angle.

9. A liquid crystal display according to claim 7, wherein said oblique light further contains a second subsidiary light beam which travels in a direction angularly farther from said frontal direction as compared with said main light beam, said second subsidiary light beam propagating from said first face to said second face and, after being inner-reflected at said second face, being directed to said light output face.

* * * * *